United States Patent [19]

Tondre et al.

[11] Patent Number: 4,678,709

[45] **Date of Patent: * Jul. 7, 1987**

[54] ELECTRICAL INSULATION

[75] Inventors: Stephen L. Tondre, Menlo Park; Hans E. Lunk, Fremont, both of Calif.

[73] Assignee: Raychem Corporation, Menlo Park, Calif.

[ * ] Notice: The portion of the term of this patent subsequent to Jun. 4, 2002 has been disclaimed.

[21] Appl. No.: 738,622

[22] Filed: May 28, 1985

Related U.S. Application Data

[63] Continuation of Ser. No. 536,919, Sep. 27, 1983, Pat. No. 4,521,485, which is a continuation-in-part of Ser. No. 418,355, Sep. 15, 1982, abandoned.

[51] Int. Cl.$^4$ .......................... B32B 15/08; H01B 7/00

[52] U.S. Cl. .......................... 428/380; 428/383; 428/461; 174/110 R; 174/110 FC

[58] Field of Search .............. 428/375, 379, 380, 383, 428/621, 461; 174/110 R, 110 FC

[56] References Cited

U.S. PATENT DOCUMENTS

| | | | |
|---|---|---|---|
| 3,217,084 | 11/1965 | Feick | 174/25 |
| 3,294,604 | 12/1966 | Feick | 156/56 |
| 3,354,129 | 11/1967 | Edmonds et al. | 528/265 |
| 3,361,593 | 1/1968 | Sattler et al. | 428/383 |
| 3,441,538 | 4/1969 | Holks | 528/171 |
| 3,446,654 | 5/1969 | Barth et al. | 428/457 |
| 3,580,829 | 9/1971 | Lanza | 525/276 |
| 3,658,932 | 4/1972 | Kwiatkowski et al. | 528/172 |
| 3,676,814 | 7/1972 | Trunzo et al. | 428/383 |
| 3,738,923 | 6/1973 | Carlson et al. | 204/159.2 |
| 3,763,222 | 10/1973 | Aronoff et al. | 526/284 |
| 3,838,097 | 9/1974 | Wilth et al. | 528/172 |
| 3,840,619 | 10/1974 | Aronoff et al. | 204/159.17 |
| 3,847,867 | 11/1974 | Heath et al. | 528/172 |
| 3,894,118 | 7/1975 | Aronoff et al. | 428/379 |
| 3,911,192 | 10/1975 | Alonoff et al. | 427/44 |
| 3,947,525 | 3/1976 | Robertson et al. | 204/195.17 |
| 3,953,400 | 4/1976 | Dahl | 528/179 |
| 3,956,240 | 5/1976 | Dahl et al. | 528/179 |
| 3,956,567 | 5/1976 | Krackeler et al. | 428/380 |
| 3,970,770 | 7/1976 | Dhami | 525/303 |
| 3,985,716 | 10/1976 | Dhami | 525/276 |
| 3,995,091 | 11/1976 | Dhami | 428/379 |
| 4,031,167 | 6/1977 | Aronoff et al. | 428/379 |
| 4,107,147 | 8/1978 | Williams, III et al. | 528/174 |
| 4,108,837 | 8/1978 | Johnson et al. | 528/174 |
| 4,121,001 | 10/1978 | Gotcher et al. | 428/379 |
| 4,155,823 | 5/1979 | Gotcher et al. | 204/159.17 |
| 4,175,175 | 11/1979 | Johnson et al. | 528/125 |
| 4,176,027 | 11/1979 | Gotcher et al. | 428/461 |
| 4,184,001 | 1/1980 | Hildreth | 428/383 |
| 4,293,670 | 10/1981 | Robeson et al. | 525/436 |
| 4,320,224 | 3/1982 | Rose et al. | 528/126 |
| 4,330,493 | 5/1982 | Miyamoto et al. | 428/383 |
| 4,379,807 | 4/1983 | Otis et al. | 428/383 |
| 4,505,978 | 3/1985 | Smith | 428/383 |

FOREIGN PATENT DOCUMENTS

| | | |
|---|---|---|
| 0040034 | 11/1981 | European Pat. Off. . |
| 0056510 | 7/1982 | European Pat. Off. . |
| 2021304 | 11/1979 | United Kingdom . |

*Primary Examiner*—John E. Kittle
*Assistant Examiner*—James J. Seidleck
*Attorney, Agent, or Firm*—Timothy H. P. Richardson; Herbert G. Burkard

[57] ABSTRACT

Electrical insulation comprises (1) an inner layer of a cross-linked polymer, e.g. polyethylene, an ethylene/-tetrafluoroethylene copolymer, an ethylene/chlorotrifluoroethylene polymer or a vinylidene fluoride polymer, and (2) an outer layer of an aromatic polymer having a glass transition temperature of at least 100° C., e.g. a polyether ether ketone, a polyether ketone or a polyether sulfone. Such insulation combines excellent properties under normal service conditions with low smoke evolution on burning, and is therefore particularly useful for aircraft wire and cable.

19 Claims, No Drawings

ELECTRICAL INSULATION

CROSS-REFERENCE TO RELATED APPLICATION

This application is a continuation of our copending commonly assigned application Ser. No. 536,919 filed Sept. 27, 1983 (now U.S. Pat. No. 4,521,485), which is a continuation-in-part of our application Ser. No. 418,355 filed Sept. 15, 1982 (now abandoned), the disclosure of which is incorporated herein by reference.

BACKGROUND OF THE INVENTION

Field of the Invention

This invention relates to insulation for electrical articles.

Introduction to the Invention

Electrical insulation must meet a variety of electrical and physical requirements under normal service conditions. In addition, for many purposes the insulation must meet test requirements which are intended to ensure that if the insulation is exposed to very high temperatures, e.g. in a fire, it will not evolve excessive amounts of toxic products or smoke. These requirements are particularly severe for electrical cable which is to be used in aircraft and similar equipment. The term "cable" is used herein to include a single electrically insulated elongate conductor (often referred to in the art as "wire"), an article comprising a plurality of separate elongate conductors each of which is separately insulated, and an article comprising a plurality of elongate conductors which are physically joined together but electrically insulated from each other by insulating material, e.g. ribbon cable.

Fluorocarbon polymers, especially ethylene/tetrafluoroethylene (ETFE) copolymers such as Tefzel, are used extensively for electrical insulation, in particular for aircraft wire. Particularly when cross-linked, such polymers can exhibit an excellent combination of physical and electrical properties under normal service conditions. In this connection, reference may be made to U.S. Pat. Nos. 3,580,829, 3,738,923, 3,763,222, 3,840,619, 3,894,118, 3,911,192, 3,947,525, 3,970,770, 3,985,716, 3,995,091, 4,031,167, 4,155,823, 4,121,001, and 4,176,027, the disclosures of which are incorporated herein by reference. Other polymers which have been used for electrical insulation include other olefin polymers (both homopolymers and copolymers) and various high-melting aromatic polymers.

SUMMARY OF THE INVENTION

We have discovered that electrical insulation which has improved properties and which can be efficiently manufactured comprises an inner layer of a cross-linked, melt-shaped olefin polymer covered by a layer of a melt-shaped aromatic polymer having a glass transition temperature of at least 100° C. Accordingly, the present invention provides an insulated electrical article, especially an insulated electrical cable, comprising:

(a) a conductor;

(b) a melt-shaped, preferably melt-extruded, inner insulating layer comprising a first organic polymer component which is a cross-linked olefin polymer, preferably a fluorocarbon polymer, particularly an ETFE copolymer, and (c) a melt-shaped, preferably melt-extruded, outer insulating layer which contacts the inner insulating layer and which comprises a second organic polymer component which is a substantially linear aromatic polymer having a glass transition temperature of at least 100° C., preferably at least 130° C.

DETAILED DESCRIPTION OF THE INVENTION

The term "olefin polymer" is used herein to denote a polymer of one or more unsubstituted and/or substituted olefins, including for example polyethylene. Where the polymer includes substituted olefins as monomers or comonomers they are preferably polar monomers and especially fluorine-containing monomers, e.g. tetrafluorethylene, or a carboxylic ester, in particular an alkyl acrylate, e.g. methyl or ethyl acrylate, or a vinyl ester, e.g. vinyl acetate. The olefin polymer is preferably a "fluorcarbon polymer", this term being used herein to denote a polymer or mixture of polymers which contains more than 10%, preferably more than 25%, by weight of fluorine. Thus the fluorocarbon polymer may be a single fluorine-containing polymer, a mixture of two or more fluorine-containing polymers, or a mixture of one or more fluorine-containing polymers with one or more polymers which do not contain fluorine. In one preferred class, the fluorocarbon polymer comprises at least 50%, particularly at least 75%, especially at least 85%, by weight of one or more thermoplastic crystalline polymers each containing at least 25% by weight of fluorine, a single such crystalline polymer being preferred. Such a fluorocarbon polymer may contain, for example, a fluorine-containing elastomer and/or a polyolefin, preferably a crystalline polyolefin, in addition to the crystalline fluorine-containing polymer or polymers. The fluorine-containing polymers are generally homo- or copolymers of one or more fluorine-containing olefinically unsaturated monomers, or copolymers of one or more such monomers with one or more olefins. The fluorocarbon polymer has a melting point of at least 150° C., and will often have a melting point of at least 250° C., e.g. up to 350° C., the melting point being defined for crystalline polymers as the temperature above which no crystallinity exists in the polymer (or when a mixture of crystalline polymers is used, in the major crystalline component in the mixture). Preferably the polymeric composition, prior to cross-linking, has a viscosity of less than $10^5$ poise at a temperature not more than 60° C. above its melting point. A preferred fluorocarbon polymer is a copolymer of ethylene and tetrafluoroethylene and optionally one or more other comonomers (known as ETFE polymers), especially a copolymer comprising 35 to 60 mole percent of ethylene, 35 to 60 mole percent of tetrafluoro-ethylene and up to 10 mole percent of one or more other comonomers. Other specific polymers which can be used include copolymers of ethylene and chlorotrifluoroethylene; polyvinylidene fluoride; copolymers of vinylidene fluoride with one or both of hexafluoropropylene and tetrafluoroethylene, or with hexafluoroisobutylene; and copolymers of tetrafluoroethylene and hexafluoropropylene.

The insulation of the articles of the invention provides a valuable combination of physical and electrical properties. The outer layer provides excellent resistance to physical abuse. The inner layer is more flexible than the outer layer and thus provides insulation which is more flexible, for a particular dielectric strength, than insulation which is composed only of the aromatic polymer. Furthermore, the aromatic polymers often have poor resistance to stress-cracking which can seriously reduce their dielectric strength The olefin polymers do not suffer from this disadvantage, and the inner jacket will therefore provide continuous insulation even in environments which cause stress-cracking of the outer jacket.

The insulation is particularly useful when the inner layer is composed of a cross-linked fluorocarbon polymer, because such insulation evolves a remarkably low level of smoke when subjected to very high temperatures. The aromatic polymers behave well under such conditions, and an outer layer of an aromatic polymer would be expected to offer some improvement in this regard; but the extent of the improvement observed is well beyond that which would have been expected. Thus it is possible, through use of the present invention, to manufacture electrical wire which, when tested for smoke evolution by ASTM E 662-79 (flaming mode), has a $D_m$ value of less than 50, preferably less than 35, where $D_m$ is the maximum specific optical density.

The olefin polymer forming the inner layer preferably has a tensile (Young's) modulus of at least 20,000 p.s.i., especially at least 30,000 p.s.i., and particularly at least 40,000 p.s.i., in order to minimize wrinkling of the outer layer when the article, e.g. in the form of a wire, is bent.

The aromatic polymers which are used in this invention are well known to those skilled in the art, and reference may be made for example to U.S. Pat. Nos. 3,354,129, 3,441,538, 3,446,654, 3,658,938, 3,838,097, 3,847,867, 3,953,400, 3,956,240, 4,107,147, 4,108,837, 4,111,908, 4,175,175, 4,293,670, 4,320,224, and 3,446,654 and British Pat. Nos. 971,227, 1,369,210 and 1,599,106, the disclosures of which are incorporated by reference. Such polymers include polyketones, polyether ketones, polyether ether ketones and polyether sulfones, polyether ketone/sulfone copolymers and polyether imides. Blends of different polymers can be used. Preferred aromatic polymers are crystalline polymers with a melting point of at least 250° C., particularly at least 300° C. In one class of such polymers the polymer comprises, and preferably consists essentially of, units of the formula $$—Ar—Q—$$

the units being the same or different, Ar being a divalent aromatic radical and Q being —O—, —S—, $—SO_2—$, —CO—, —NH—CO— or —COO—, or Ar being a polyvalent radical and Q being

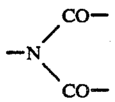

the valencies of the Q radical preferably being directly linked to aromatic carbon atoms in the Ar radical.

In another class of aromatic polymers, the aromatic polymer is a crystalline polyarylene ether comprising recurring units of the formula $$—O—E—O—E'—$$

where E is the residue of a dihydric phenol and E' is the residue of an aromatic compound having an electron-withdrawing group in at least one of the positions *ortho* and *para* to the valence bonds, the E and E' radicals being linked to the —O— radicals through aromatic carbon atoms. In one preferred sub-class, E is a radical of the formula

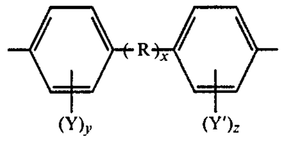

wherein R is a divalent radical; x is 0 or 1; Y is a radical selected from halogen atoms, alkyl radicals containing 1 to 4 carbon atoms and alkoxy radicals containing 1 to 4 carbon atoms; y is 0,1,2,3 or 4; Y' is a radical selected from halogen atoms, alkyl radicals containing 1 to 4 carbon atoms and alkoxy radicals containing 1 to 4 carbon atoms; z is 0,1,2,3 or 4, and E' is a radical of the formula

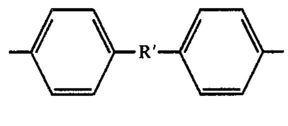

wherein R' is a sulfone, carbonyl, vinyl, sulfoxide, azo, saturated fluorocarbon, organic phosphine oxide or ethylidene radical. In this class, preferred polysulfones are those in which y and z are O, x is 1, R' is a sulfone radical and R is a radical of the formula

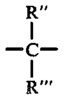

wherein each of R'' and R''' is independently selected from the group consisting of hydrogen; alkyl radicals containing 1 to 4 carbon atoms; halogen-substituted alkyl radicals containing 1 to 4 carbon atoms; aryl, alkaryl and aralkyl radicals containing 6 to 10 carbon atoms; and halogen-substituted aryl, alkaryl and aralkyl radicals containing 6 to 10 carbon atoms.

In another class of aromatic polymers, the polymer is a polyether imide or polysulfone imide which comprises recurring units of the formula

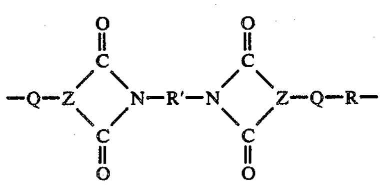

where Q is —O— or $—SO_2$, Z is a trivalent aromatic radical, R is a divalent aromatic radical and R' is a divalent organic radical.

Preferred aromatic polymers consist essentially of repeating units having one of the following formulae (1)

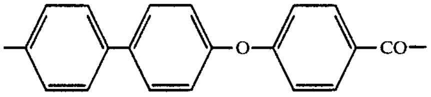

(2)

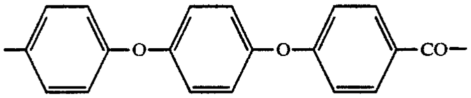

(3)

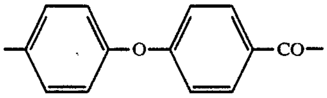

(4)

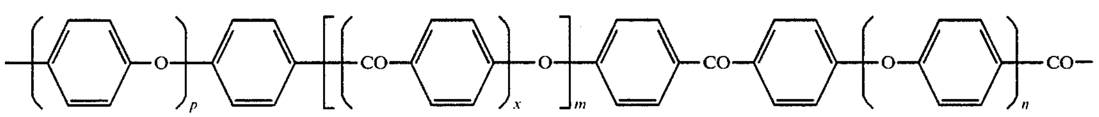

wherein each of x, m and n is 0 or 1, with n being 0 when x is 1, p is an integer from 1 to 4, with m being 1 and x being 0 when p is greater than 1, e.g.,

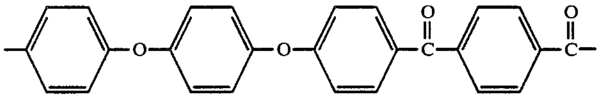

(5)

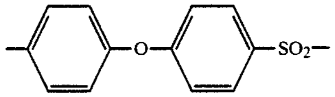

(6)

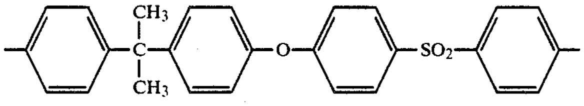

or (7)

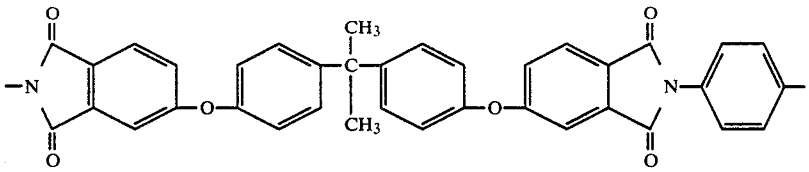

The insulated articles of the present invention can be produced by conventional techniques; the inner layer usually contacts the conductor, and the inner and outer layers generally constitute the total insulation of the article; however, other insulating layers can be present. The fluorocarbon polymer is preferably cross-linked by radiation, and cross-linking can be effected before or after the aromatic polymer (which is generally not cross-linked by radiation) is applied. For electrical cable, the inner layer will usually be of annular cross-section of thickness for example 3 to 15 mils, preferably 4 to 7 mils. The outer layer may also be of annular cross section of thickness for example 3 to 15 mils, preferably 4 to 7 mils. Alternatively, the cable can comprise a plurality of conductors, each of which has an inner insulating layer around it, with the conductors being joined together and further insulated by the outer insulating layer.

The invention is illustrated by the following Examples.

EXAMPLES

The invention is illustrated in the following Examples, which are summarized in the Table below. Examples 1, 2, 3 and 8 are comparative Examples. In each of the Examples, a 20 AWG stranded (19/32) conductor was extrusion-coated with an inner insulating layer having the composition and thickness shown in the Table. Except in Examples 1 and 2, the inner insulating layer was then extrusion-coated with an outer insulating layer having the composition and thickness shown in the Table. In some of the Examples, as designated in the Table, the coated conductor was irradiated to a dosage of about 10 Megarads to cross-link the inner coating; in these Examples, the inner coating also contained, when it was irradiated, a suitable amount of a radiation cross-linking agent. The outer coating was substantially unaffected by this irradiation. The coated conductor was annealed at 180° C. for 1 hour. Samples of the resulting cable were tested in accordance with the procedure of ASTM E 662-79 (flaming mode), and the Table shows the values obtained for the minimum transmittance, the transmittance after 10 minutes, the time taken to reach the point of minimum transmittance, and the maximum optical density ($D_m$).

The various polymers used in the Examples are further identified below:

- Tefzel 280 is a copolymer of ethylene and tetrafluoroethylene available from du Pont.
- Halar 300 is a copolymer of ethylene and chlorotrifluoroethylene available from Allied Chemical.
- Kynar 450 is polyvinylidene fluoride available from Pennwalt.
- PEEK is a polyether ether ketone available from ICI.
- Ultem is a polyetherimide available from General Electric.
- Victrex 200P a polyethersulphone available from ICI.

PEEK, Ultem and PES are substantially linear aromatic polymers.

TABLE

| | 1(C) | 2(C) | 3(C) | 4 | 5 | 6 | 7 | 8(C) | 9 |
|---|---|---|---|---|---|---|---|---|---|
| INNER INSULATING LAYER | | | | | | | | | |
| Composition | | | | | | | | | |
| Tefzel 280 | x | x | x | x | x | x | x | — | — |
| Halar 300 | — | — | — | — | — | — | — | x | x |
| Thickness (mils) | 10 | 10 | 4 | 4 | 4 | 4 | 4 | 4 | 4 |
| OUTER INSULATING LAYER | none | none | | | | | | | |
| Composition | | | | | | | | | |
| PEEK | — | — | x | x | x | — | — | x | x |
| Ultem | — | — | — | — | — | — | x | — | — |
| Victrex 200P | — | — | — | — | — | x | — | — | — |
| | — | — | — | — | — | — | — | — | — |
| Thickness (mils) | — | — | 6 | 6 | 5 | 5 | 5 | 6 | 6 |
| Cross-linking | no | yes | no | yes | yes | yes | yes | no | yes |
| TRANSMITTANCE | | | | | | | | | |
| Minimum | 0.18 | 0.46 | 10 | 67 | 47 | 59 | 71 | 32 | 59 |
| at 10 minutes | 4.5 | 4.5 | 60 | 96 | 90 | 90 | 96 | 88 | 91 |
| Time to Min. Transmittance (minutes) | 19 | 16 | 25 | 26 | 23 | 26 | 30 | 25 | 27 |
| $D_m$ (Max Optical Density) | 362 | 309 | 132 | 23 | 43 | 30 | 20 | 55 | 30 |

We claim:

1. An insulated electrical article, comprising
(a) a metal conductor;
(b) a melt-shaped inner insulating layer comprising a first organic polymer component which is a cross-linked olefin polymer, and
(c) a melt-shaped outer insulating layer which contacts the inner insulating layer and which comprises a second organic polymer component which is a substantially linear aromatic polymer having a glass transition temperature of at least 100° C.

2. An article according to claim 1 wherein the inner layer is in contact with the conductor, and the outer layer is in contact with the inner layer.

3. An article according to claim 1 wherein the inner layer is radiation cross-linked.

4. An article according to claim 1 wherein the olefin polymer is polyethylene.

5. An article according to claim 1 wherein the aromatic polymer is a crystalline polymer having a melting point of at least 250° C.

6. An article according to claim 1 wherein the aromatic polymer comprises units of the formula —Ar—Q— wherein Ar is a polyvalent aromatic radical and Q is a radical of the formula

—O— —S— —$SO_2$— —CO— —NH.CO— —COO— or

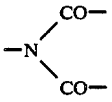

7. An article according to claim 1 wherein the aromatic polymer is a crystalline polyarylene ether comprising recurring unit of the formula

—O—E—O—E'— where E is the residue of a dihydric phenol and E' is the residue of an aromatic compound having an electron-withdrawing group in at least one of the positions *ortho* and *para* to the valence bonds; the E and E' radicals being linked to the —O— radicals through aromatic carbon atoms.

8. An article according to claim 1 wherein the aromatic polymer consists essentially of repeating units of the formula

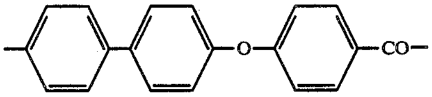

9. An article according to claim 1 wherein the aromatic polymer consists essentially of repeating units of the formula

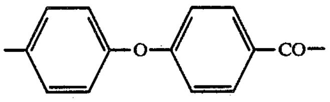

10. An article according to claim 1 wherein the aromatic polymer consists essentially of repeating units of the formula

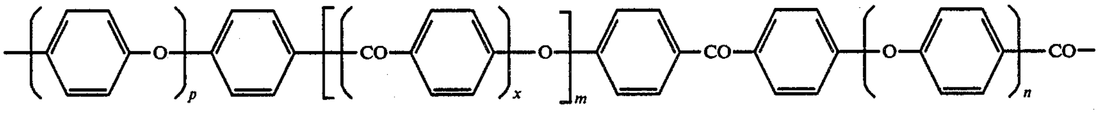

wherein each of x, m and n is 0 or 1, with n being 0 when x is 1, p is an integer from 1 to 4, with m being 1 and x being 0 when p is greater than 1.

11. An article according to claim 1 wherein the aromatic polymer consists essentially of repeating units of the formula

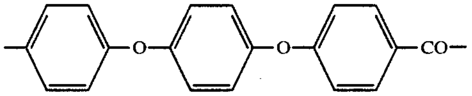

12. An article according to claim 1 wherein the aromatic polymer consists essentially of repeating units of the formula

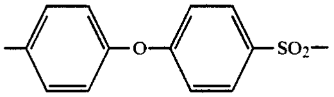

13. An article according to claim 1 wherein the aromatic polymer consists essentially of repeating units of the formula

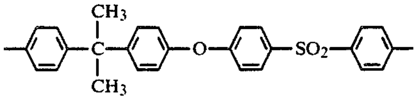

wherein each of x, m and n is 0 or 1, with n being 0 when x is 1, p is an integer from 1 to 4, with m being 1 and x being 0 when p is greater than 1.

14. Electrical cable which comprises (a) a metal conductor, (b) a melt-extruded inner insulating layer which surrounds and contacts the conductor and which comprises a first organic polymer component which is a cross-linked olefin polymer, and (c) a melt-extruded outer insulating layer which surrounds and contacts the inner insulating layer and which comprises a second organic polymer component which is a substantially linear aromatic polymer having a glass transition temperature of at least 100° C.

15. Cable according to claim 14 wherein the inner layer is of annular cross-section with a wall thickness of 3 to 10 mils, and the outer layer is of annular cross-section with a wall thickness of 3 to 15 mils.

16. Cable according to claim 14 wherein the first organic polymer component is a cross-linked polymer of one or more unsubstituted olefins.

17. Cable according to claim 16 wherein the aromatic polymer is a crystalline polymer which has a melting point of at least 250° C. and which consists essentially of units of the formula —Ar—Q— wherein Ar is a polyvalent aromatic radical and Q is a radical of the formula

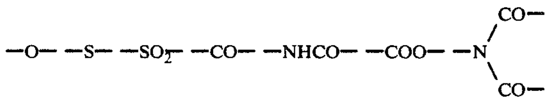

18. Cable according to claim 17 wherein the aromatic polymer is a polyether ether ketone.

19. Cable according to claim 16 wherein the first organic polymer component is cross-linked polyethylene.

* * * * *